(12) United States Patent
Keogh

(10) Patent No.: US 10,094,588 B2
(45) Date of Patent: Oct. 9, 2018

(54) WIFI VERTICAL FAN COIL SYSTEM

(71) Applicant: Invicon Inc., Woodbridge (CA)

(72) Inventor: Gerald P. Keogh, London (CA)

(73) Assignee: INVICON INC., Woodbridge (CA)

( * ) Notice: Subject to any disclaimer, the term of this patent is extended or adjusted under 35 U.S.C. 154(b) by 84 days.

(21) Appl. No.: 15/291,189

(22) Filed: Oct. 12, 2016

(65) Prior Publication Data
US 2018/0100664 A1    Apr. 12, 2018

(51) Int. Cl.
| | | |
|---|---|---|
| *F24F 11/83* | (2018.01) | |
| *F24F 11/62* | (2018.01) | |
| *F24F 11/30* | (2018.01) | |
| *G05B 19/048* | (2006.01) | |
| *F24F 11/58* | (2018.01) | |
| *F24F 11/64* | (2018.01) | |
| *F24F 11/84* | (2018.01) | |
| *F24F 11/00* | (2018.01) | |
| *F24F 110/20* | (2018.01) | |
| *F24F 140/20* | (2018.01) | |
| *F24F 110/10* | (2018.01) | |

(52) U.S. Cl.
CPC .............. *F24F 11/83* (2018.01); *F24F 11/30* (2018.01); *F24F 11/62* (2018.01); *G05B 19/048* (2013.01); *F24F 11/58* (2018.01); *F24F 11/64* (2018.01); *F24F 11/84* (2018.01); *F24F 2011/0002* (2013.01); *F24F 2110/10* (2018.01); *F24F 2110/20* (2018.01); *F24F 2140/20* (2018.01); *G05B 2219/2614* (2013.01)

(58) Field of Classification Search
CPC ........... G05B 19/048; G05B 2219/2614; F24F 2011/0002
See application file for complete search history.

(56) References Cited

U.S. PATENT DOCUMENTS

| | | | |
|---|---|---|---|
| 7,334,542 B2 | 2/2008 | Zorzit et al. | |
| 8,939,826 B2 | 1/2015 | Zorzit et al. | |
| 2006/0149395 A1* | 7/2006 | Archacki, Jr. | ......... G05B 15/02 700/19 |
| 2007/0108307 A1* | 5/2007 | Sinclaire | .................. F24D 3/08 237/69 |

(Continued)

*Primary Examiner* — Yuhui R Pan
(74) *Attorney, Agent, or Firm* — Bereskin & Parr LLP/S.E.N.C.R.L., s.r.l.

(57) ABSTRACT

In some examples, a system includes an apparatus for heating, ventilation and/or cooling of an interior space of a structure, a control interface device for receiving local instructions to control the apparatus and monitoring the interior space to generate monitoring data, and a processor coupled to the apparatus and the control interface device. The apparatus can include a sensor for monitoring the apparatus and generating apparatus data. The local instructions can include a first temperature setting. The monitoring data can include a monitored temperature of the interior space. The processor can be configured for receiving the local instructions, the monitoring data, the apparatus data, and remote instructions including a second temperature setting to control the apparatus from a client device, and generating commands to operate the apparatus based on at least one of the first temperature setting, the second temperature setting, the monitored temperature, and the apparatus data.

27 Claims, 6 Drawing Sheets

(56) References Cited

U.S. PATENT DOCUMENTS

| | | | |
|---|---|---|---|
| 2013/0017774 A1* | 1/2013 | Zorzit | F24F 1/0007 454/239 |
| 2013/0218351 A1* | 8/2013 | Warren | F24F 11/0012 700/278 |
| 2014/0172350 A1* | 6/2014 | Lothamer | G01K 1/024 702/133 |
| 2015/0122472 A1* | 5/2015 | Higuchi | B60H 1/00849 165/202 |
| 2015/0198346 A1* | 7/2015 | Vedpathak | G05B 15/02 700/278 |
| 2015/0297776 A1* | 10/2015 | Conroy | G06Q 10/08 239/11 |

* cited by examiner

WIFI VERTICAL FAN COIL SYSTEM

FIELD

The present disclosure relates generally to the field of heating, ventilation and air conditioning (HVAC) technology, and in particular, monitoring and controlling HVAC apparatuses.

BACKGROUND

The following paragraphs are not an admission that anything discussed in them is prior art or part of the knowledge of persons skilled in the art.

HVAC apparatuses are used to control interior space of structures so that it is comfortable for individuals. In multi-unit structures, separate HVAC apparatuses can be provided to each unit to suit the preferences of the individuals in that unit. Traditionally, an HVAC apparatus can be controlled by a thermostat located within the unit. The thermostat can be programmed to store a schedule that indicates a desired temperature at various times throughout a day. The HVAC apparatus is operated in accordance with the stored schedule.

INTRODUCTION

The following is intended to introduce the reader to the detailed description that follows and not to define or limit the claimed subject matter.

In an aspect of the present disclosure, a system can include: an apparatus for heating, ventilation and/or cooling of an interior space of a structure, the apparatus including at least one sensor for monitoring the apparatus and generating apparatus data; at least one control interface device for receiving local instructions to control the apparatus and monitoring the interior space to generate monitoring data, the local instructions including at least a first temperature setting, the monitoring data including a monitored temperature of the interior space; and a processor coupled to the apparatus and the at least one control interface device, the processor being configured for receiving the local instructions and the monitoring data from the at least one control interface device, the apparatus data from the apparatus, and remote instructions to control the apparatus from a client device, the remote instructions including a second temperature setting, and generating commands to operate the apparatus based on at least one of the first temperature setting, the second temperature setting, the monitored temperature, and the apparatus data.

The processor can be in wired communication with the at least one control interface device. The wired communication can include a direct pin connection. The wired communication can include a data communication link. The data communication link can include at least one of an RS-485 communication link, a seven wire hydronic control coupling, and a nine wire hydronic control coupling.

The at least one control interface device can include at least one of a manual control button and a thermostat.

The system can include a 24 VAC connection coupling the processor to the apparatus.

The local instructions can include a local temperature schedule, the local temperature schedule being indicative of a temperature setting for each of a plurality of times; and the generating commands can include, for a relevant time, identifying a relevant temperature setting from the local temperature schedule as the first temperature setting.

The remote instructions can include a remote temperature schedule, the remote temperature schedule being indicative of a temperature setting for each of a plurality of times; and the generating commands can include, for a relevant time, identifying a relevant temperature setting from the remote temperature schedule as the second temperature setting.

The generating commands can include: determining a set temperature based on the first temperature setting and the second temperature setting; comparing the set temperature to the monitored temperature; if the monitored temperature is substantially less than the set temperature, generating commands to operate the apparatus in a heating mode; if the monitored temperature is substantially greater than the set temperature, generating commands to operate the apparatus in a cooling mode; and otherwise generating commands to operate the apparatus in an ambient mode.

The determining a set temperature can include identifying one of the at least a first temperature setting and the second temperature setting that was received last as the set temperature.

The apparatus can include at least one water valve, each of the at least one water valve being supplied with either cold water or hot water; for a water valve supplied with cold water, the commands to operate the apparatus in an ambient mode can include a command to close the water valve, and the commands to operate the apparatus in a cooling mode can include a command to open the water valve; and for a water valve supplied with hot water, the commands to operate the apparatus in a heating mode can include a command to open the water valve, and the commands to operate the apparatus in a cooling mode or an ambient mode can include a command to close the water valve.

The at least one sensor can include a water temperature sensor located on or substantially near the water valve for generating supply water temperature apparatus data; and the generating commands can include: comparing the supply water temperature to a pre-determined cold water temperature and a pre-determined hot water temperature; if the supply water temperature is less than the pre-determined cold water temperature, determining that cold water is supplied to the water valve; if the supply water temperature is greater than the pre-determined hot water temperature, determining that hot water is supplied to the water valve.

The apparatus can include a vertical fan coil; the apparatus data can include a vertical fan coil temperature; and the generating commands can include comparing the vertical fan coil temperature to a pre-determined vertical fan coil freezing temperature, for a water valve supplied with cold water, if the vertical fan coil temperature is less than the pre-determined vertical fan coil freezing temperature, generating commands to perform at least one of close the water valve and energize an auxiliary heater, and otherwise maintaining commands to operate the apparatus.

The at least one sensor can include a temperature sensor for generating resistance apparatus data; and the processor can be configured for storing a resistance-to-temperature mapping, the resistance-to-temperature mapping can include a temperature for each of a plurality of resistances, and for the resistance apparatus data, identifying corresponding vertical fan coil temperature apparatus data based on the resistance-to-temperature mapping.

The apparatus can include a fresh air supply stream and the at least one sensor can be located on the fresh air supply stream.

The apparatus can include an auxiliary heater; the commands to operate the apparatus in a heating mode can include a command to energize the auxiliary heater; and the commands to operate the apparatus in a cooling mode or an ambient mode can include a command to de-energize the auxiliary heater.

The apparatus can include an air delivery module, the air delivery module being operable at a plurality of speed settings.

At least one of the local instructions and remote instructions can include a set speed, the set speed being one of the plurality of speed settings; and the commands to operate the apparatus can include commands to operate the air delivery module at the set speed.

The generating commands to operate the apparatus in a heating mode or a cooling mode can include selecting a set speed from the plurality of speed settings based on a magnitude of difference between the set temperature and the monitored temperature; and the generating commands to operate the apparatus in an ambient mode can include generating commands to operate the air delivery module at a low speed setting.

The apparatus can include a drain pan; the apparatus data can include a fill level of the drain pan; and the generating commands can include comparing the fill level to a pre-determined drain pan fill limit, if the fill level is greater than the pre-determined drain pan fill limit, generating commands to discontinue operating the apparatus, and otherwise maintaining commands to operate the apparatus.

The at least one sensor can include a Hall effect sensor for generating the fill level apparatus data.

The monitoring data can include a humidity level of the interior space.

The system can include the client device for generating the remote instructions and transmitting the remote instructions to the processor. The client device can be in wireless data communication with the processor. The client device can be configured for: receiving a notification from the processor based on at least one of the apparatus data and the monitoring data; and providing the notification to a user of the client device.

The system can include a server for receiving the remote instructions from the client device and transmitting the remote instructions to the processor. The server can be in wireless data communication with at least one of the client device and the processor.

In an aspect of the present disclosure, a method of controlling an apparatus for heating, ventilation and/or cooling of an interior space of a structure can include: receiving local instructions to control the apparatus, the local instructions including at least a first temperature setting; transmitting the local instructions to a processor; receiving remote instructions to control the apparatus, the remote instructions can include a second temperature setting; transmitting the remote instructions to the processor; monitoring at least one of the interior space and the apparatus to generate monitoring data, the monitoring data including a monitored temperature of the interior space; transmitting the monitoring data to the processor; at the processor, generating commands to operate the apparatus based on at least one of the first temperature setting, the second temperature setting, and the monitored temperature; and operating the apparatus based on the commands.

The local instructions can include a local temperature schedule, the local temperature schedule being indicative of a temperature setting for each of a plurality of times; and the generating commands can include, for a relevant time, identifying a relevant temperature setting from the local temperature schedule as the first temperature setting.

The remote instructions can include a remote temperature schedule, the remote temperature schedule being indicative of a temperature setting for each of a plurality of times; and the generating commands can include, for a relevant time, identifying a relevant temperature setting from the remote temperature schedule as the second temperature setting.

The generating commands can include: determining a set temperature based on the first temperature setting and the second temperature setting; comparing the set temperature to the monitored temperature; if the monitored temperature is substantially less than the set temperature, generating commands to operate the apparatus in a heating mode; if the monitored temperature is substantially greater than the set temperature, generating commands to operate the apparatus in a cooling mode; and otherwise generating commands to operate the apparatus in an ambient mode.

The determining a set temperature can include identifying one of the at least a first temperature setting and the second temperature setting that was received last as the set temperature.

The method can include supplying either cold water or hot water to each of at least one water valve of the apparatus, wherein: for a water valve supplied with cold water, the commands to operate the apparatus in an ambient mode can include a command to close the water valve, and the commands to operate the apparatus in a cooling mode can include a command to open the water valve; and for a water valve supplied with hot water, the commands to operate the apparatus in a heating mode can include a command to open the water valve, and the commands to operate the apparatus in a cooling mode or an ambient mode can include a command to close the water valve.

For a water valve supplied with cold water, the commands to operate the apparatus in a heating mode can include a command to energize an auxiliary heater of the apparatus.

The method can include monitoring a supply water temperature of at least one water valve of the apparatus, wherein the generating commands can include: comparing the supply water temperature to a pre-determined cold water temperature and a pre-determined hot water temperature; if the supply water temperature is less than the pre-determined cold water temperature, determining that cold water is supplied to the water valve; and if the supply water temperature is greater than the pre-determined hot water temperature, determining that hot water is supplied to the water valve.

The method can include monitoring a temperature of a vertical fan coil of the apparatus, wherein the generating commands can include: comparing the vertical fan coil temperature to a pre-determined vertical fan coil freezing temperature; if the vertical fan coil temperature is less than the pre-determined vertical fan coil freezing temperature, generating commands to perform at least one of close the water valve and energize an auxiliary heater of the apparatus; and otherwise maintaining commands to operate the apparatus.

The monitoring a temperature of a vertical fan coil of the apparatus can include: generating resistance data; storing a resistance-to-temperature mapping, the resistance-to-temperature mapping can include a temperature for each of a plurality of resistances; and for the resistance data, identifying corresponding vertical fan coil temperature data based on the resistance-to-temperature mapping.

The commands to operate the apparatus in a heating mode can include a command to energize an auxiliary heater of the apparatus; and the commands to operate the apparatus in a cooling mode can include a command to de-energize the auxiliary heater.

At least one of the local instructions and remote instructions can include a set speed; and the commands to operate the apparatus can include commands to operate an air delivery module at the set speed, the air delivery module being operable at a plurality of speed settings, the set speed being one of the plurality of speed settings.

The generating commands to operate the apparatus in a heating mode or a cooling mode can include selecting a set speed at which to operate the air delivery module based on a magnitude of difference between the set temperature and the monitored temperature, the air delivery module being operable at a plurality of speed settings, the set speed being one of the plurality of speed settings; and the generating commands to operate the apparatus in an ambient mode can include generating commands to operate the air delivery module at a low speed setting.

The method can include monitoring a fill level of a drain pan of the apparatus, wherein the generating commands can include: comparing the fill level to a pre-determined drain pan fill limit; if the fill level is greater than the pre-determined drain pan fill limit, generating commands to discontinue operating the apparatus; and otherwise maintaining commands to operate the apparatus.

The method can include monitoring a humidity level of the interior space.

The method can include transmitting a notification to a client device based on at least one of the apparatus data and the monitoring data.

In an aspect of the present disclosure, a method of installing a system for remotely controlling an apparatus for heating, ventilation and/or cooling of an interior space of a structure can include: decoupling at least one control interface device from the apparatus, the at least one control interface device for receiving local instructions to control the apparatus and monitoring the interior space to generate monitoring data, the local instructions including at least a first temperature setting, the monitoring data can include a monitored temperature of the interior space; and coupling a processor to the apparatus and the at least one control interface device, the apparatus including at least one sensor for monitoring the apparatus and generating apparatus data; wherein the processor is configured for receiving the local instructions, the monitoring data, the apparatus data, and remote instructions to control the apparatus, the remote instructions including a second temperature setting, and generating commands to operate the apparatus based on at least one of the first temperature setting, the second temperature setting, the monitored temperature, and the apparatus data.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
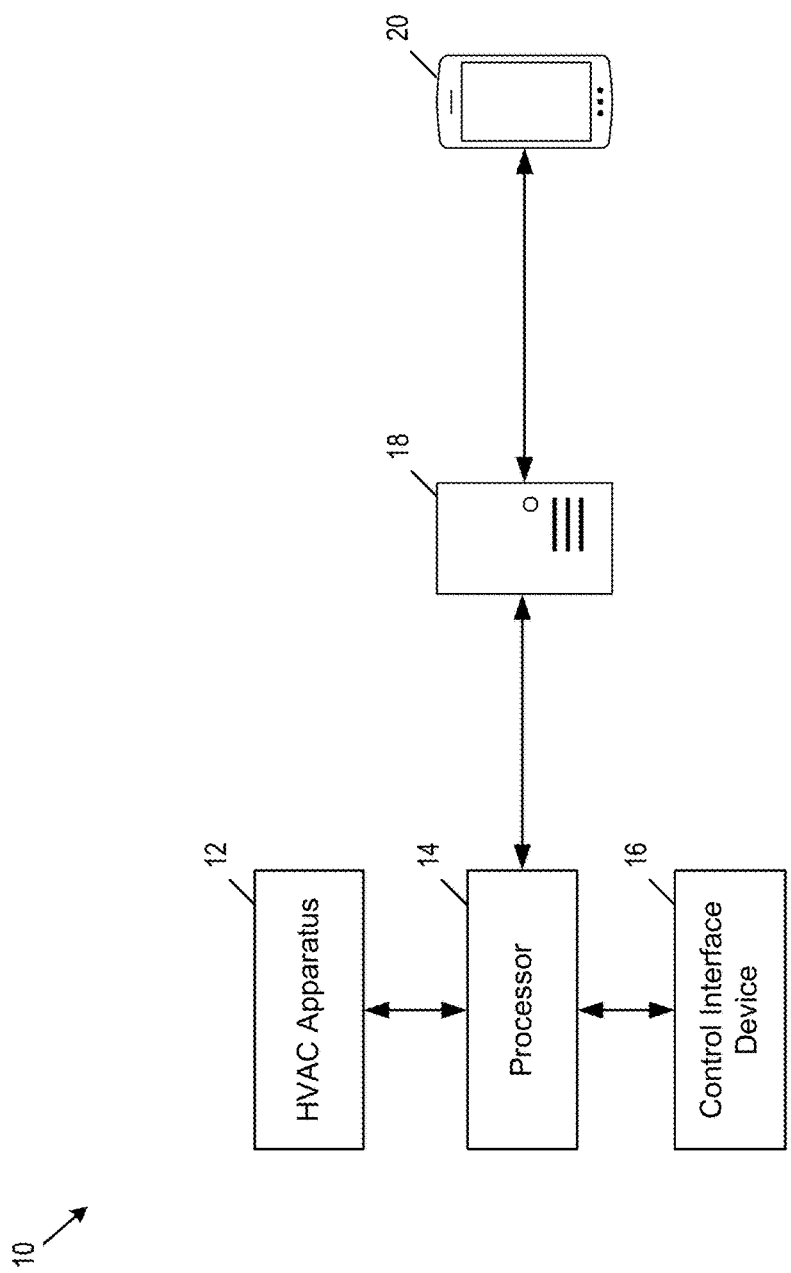
FIG. 1 is a schematic drawing of an example of a system for monitoring and controlling an HVAC apparatus.

FIG. 1 shows an example of a system 10 for heating, ventilation and/or cooling of an interior space of a structure. In the example shown in FIG. 1, the system 10 includes an HVAC apparatus 12, a processor 14, and a control interface device 16. The system 10 can be configured for data communication with a server 18. In some examples, the system 10 can include the server 18. The server 18 can also be configured for data communication with a client device 20.

The HVAC apparatus 12 can include a hydronic heating and cooling unit for conditioning (heating or cooling) air to provide supply air for the interior space. In a hydronic heating and cooling unit, hot or cold water from a central source is directed through the interior of a hydronic coil while air is driven through the exterior of the hydronic coil by an air delivery module. The air is then directed to the interior space by an air delivery module. The hydronic coil is herein referred to as a hydronic heating and cooling source. Hydronic heating and cooling units can be vertically configured, herein referred to as "vertical fan coil units", or horizontally configured. Hydronic heating and cooling units can be used in individual units of multi-unit buildings to allow individual units to control the HVAC of their unit. For example, hydronic heating and cooling units can be used in multi-unit residential buildings (i.e. condominiums, apartments, retirement residences), hotels, resorts, commercial and/or office buildings, hospitals, and schools.

The hydronic heating and cooling source can be a two-pipe system or a four-pipe system. A four-pipe system provides two supply lines and two return lines. Cold water is supplied to a first supply line and hot water is supplied to a second supply line.

A two-pipe system provides a single supply line and a single return line. The supply line can be supplied with either cold or hot water. Generally, the supply of either cold or hot water to a two-pipe system varies with seasons. For example, during seasons with cold weather, the HVAC apparatus 12 may be expected to provide heating. Accordingly, the supply line would be supplied with hot water. During seasons with hot weather, the HVAC apparatus 12 may be expected to provide cooling and the supply line would be supplied with cold water. In a multi-unit building, the supply of cold or hot water to the single supply line may be controlled by building management of the multi-unit building.

Each supply line is typically equipped with at least one supply valve to control the flow of water to that supply line and the hydronic coil. The supply valves can be equipped with actuators to open and close the supply valves. In some examples, the actuator can be an electric actuator. Each of the electric actuators can have a power rating of, for example, 3.5 Watts (W). Each of the electric actuators can require an electric current of, for example, 24 volts of alternating current (VAC). When the supply valves are equipped with actuators, the supply valves can be controlled remotely. Control of the supply valves can be based on various parameters, including but not limited to, the temperature of the supply line, that is, the temperature of the water provided to the supply line.

It should be noted that in addition to supply valves, each supply line can also be equipped with at least one isolation valve to isolate the supply line and the hydronic coil during installation and maintenance. Isolation valves are typically manual valves.

In some examples, the hydronic heating and cooling source can also include a drain pan for collecting condensate water from the hydronic coil, the supply and/or return lines. The drain pan can also be equipped with a sensor to detect the fill level of the drain pan. Any appropriate sensors can be used to detect the fill level of the drain pan, including optical, acoustic, and/or electrode sensors. In some examples, the sensor can be a combination of a magnetic float and a Hall effect sensor. The Hall effect sensor can detect the fill level of the drain pan based on the magnetic field of the magnetic float. By detecting the fill level of the drain pan, appropriate action can be taken to prevent the drain pan from overfilling. For example, the control of the supply valves on the supply lines and/or an auxiliary heater of the air delivery module can also be based on the fill level of the drain pan. In some examples, if the drain pan is overfilled or close to overfilling, the supply valves can be closed to stop the supply of water and further condensation.

The air delivery module can be a fan or blower assembly having a motor. The motor can be a variable speed drive that is capable of operating at a plurality of speeds. The motor can be capable of operating at any appropriate number of speeds. For example, the air delivery module, via the motor, can be capable of operating at low, medium, and high speeds. Alternatively, the air delivery module can be capable of operating at ten (10) different speeds. In some examples, the air delivery module can operate at a speed that is proportional to an input command.

The air delivery module can include an auxiliary heater. The auxiliary heater can further heat the air after it passes through the hydronic heating and cooling source and before it is directed to the interior space. In particular, the auxiliary heater can heat air in a two-pipe system when the supply line is provided with cold water and the HVAC apparatus 12 is operating to provide heating. It will be appreciated that the auxiliary heater would be unnecessary in a four-pipe system. The auxiliary heater can include heating elements, and in particular, resistive wire electrical heating elements. The electrical heating elements can have a power rating, for example, in the range of 750 W to 1.5 kW. The heating elements can require an electric current of, for example, 115 VAC or 230 VAC. Similar to the control of the supply valves, the operation of the auxiliary heater can be based on, but is not limited to, the temperature of the supply line. For example, additional temperature sensors can be provided to measure the temperature of the air after it passes through the hydronic heating and cooling source and the operation of the auxiliary heater can be based on the temperature of the air after it passes through the hydronic heating and cooling source. The additional temperature sensors to measure the temperature of the air after it passes through the hydronic heating and cooling source can be thermal limit switches.

As set out above, the air delivery module drives air through the exterior of the hydronic heating and cooling source. Air entering the hydronic heating and cooling source is herein referred to as incoming air. Air exiting the hydronic heating and cooling source is herein referred to as outgoing air. Incoming air that is too cold can cause the hydronic coil to freeze. Temperature sensors can be provided to measure the temperature of incoming air. Any appropriate sensor technology for measuring air temperature can be used. For example, resistive sensors can be used to measure the temperature of incoming air.

In some examples, the temperature of incoming air can be used to determine the actual temperature of the interior space. The operation of the HVAC apparatus 12 can be based on the difference between the actual temperature of the interior space and a desired temperature of the interior space. The temperature of incoming air can be used to determine the actual temperature of the interior space if there are no other means to determine the actual temperature of the interior space. That is, if other temperature sensors are not provided or fail. For example, other temperature sensors can be provided on the control interface device 16 (set out below).

As well, the operation of the hydronic heating and cooling source, namely the supply valves on the supply lines, can also be based on the temperature of incoming air to prevent freezing the hydronic coil. For example, when the temperature of incoming air is less than 1 degree Celsius, the supply valve for hot water supply can be opened. In another example, the supply valve for hot water supply can be opened after a pre-determined delay. An appropriate value for the pre-determined delay can be used. In some examples, the pre-determined delay can be about ninety (90) minutes. In some examples, the pre-determined delay can be between sixty (60) and ninety (90) minutes. In some examples, the pre-determined delay can be over ninety (90) minutes. During the delay, the apparatus can continue to operate despite the temperature of incoming air being less than 1 degree Celsius. In another example, when the temperature of incoming air is less than 1 degree Celsius, the auxiliary heater can be energized.

The control interface device 16 receives instructions from the user for controlling the operation of the HVAC apparatus 12 via the processor 14. For example, the control interface device 16 can be one or more manual pushbuttons and/or slide switches located on the HVAC apparatus 12. The manual pushbuttons and/or slide switches can allow a user to indicate, or set, a speed at which the air delivery module of the HVAC apparatus 12 should operate. The speed at which the air delivery module of the HVAC apparatus 12 should operate is herein referred to as a "speed setting". The manual pushbuttons and/or slide switches can also allow a user to indicate, or set, a desired temperature for the interior space that the HVAC apparatus 12. The desired temperature for the interior space that the HVAC apparatus 12 is herein referred to as a "temperature setting". In some examples, light emitting diodes (LEDs) are provided in conjunction with the manual pushbuttons and/or slide switches to provide indications to the user on the position of the manual pushbuttons and/or slide switches, or the status of the HVAC apparatus 12.

In other examples, the control interface device 16 can be a thermostat. FIGS. 2A to 4 show an example of a thermostat. The thermostat can be wall-mounted and in the vicinity of the HVAC apparatus 12, or within the interior space that is being air conditioned by the HVAC apparatus 12. The thermostat can be contained within a flame retardant housing for protecting the thermostat from fire.

Figure 2A:
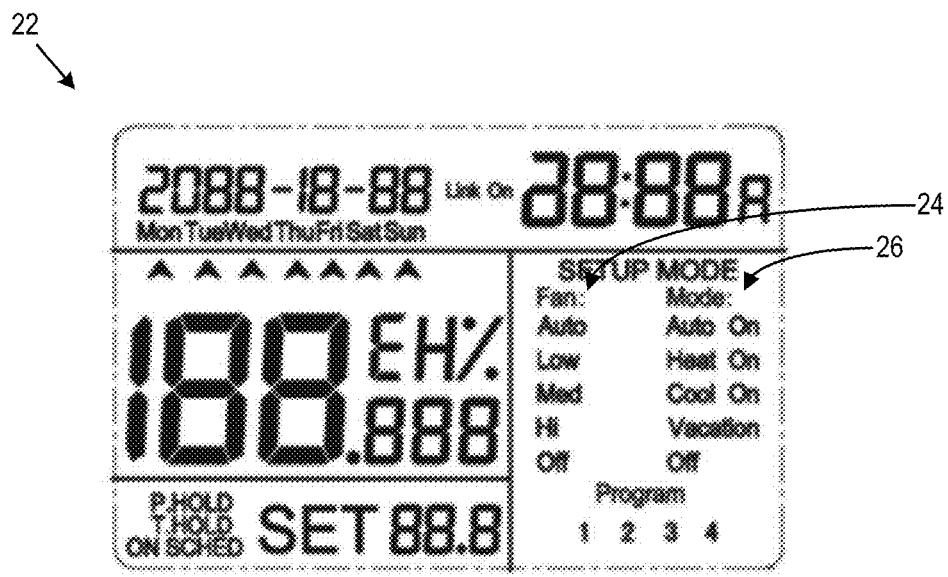
FIG. 2A is an example of a control interface device output subsystem.
Figure 2B:
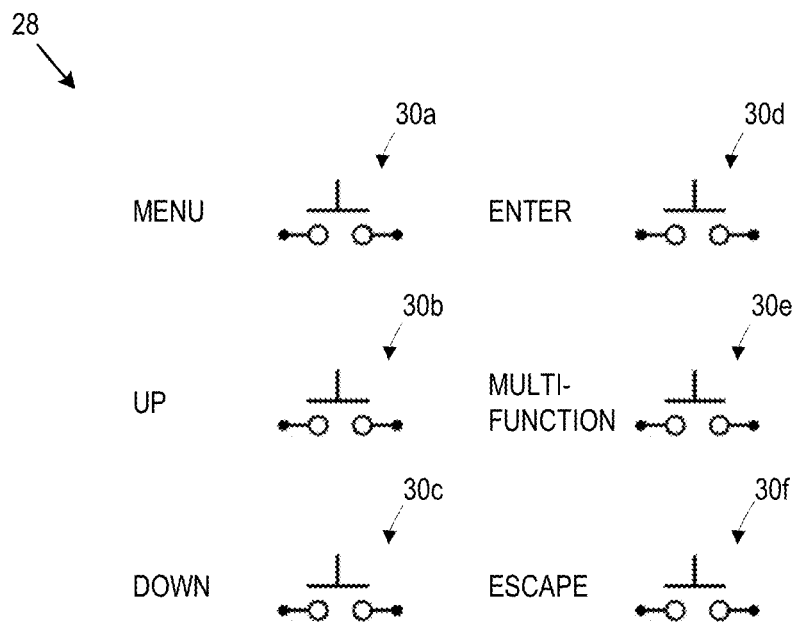
FIG. 2B is an example of a control interface device input subsystem.

The thermostat can include input and output subsystems for providing information to and from the user. Input subsystems can include one or more of a display module, microphone, function keys, keypad, or key assembly. FIG. 2B shows an example of a thermostat keypad 28. As shown in FIG. 2B, keys can be provided for "MENU" 30a, navigation (i.e. "UP" 30b and "DOWN" 30c), "ENTER" 30d, "MULTI-FUNCTION" 30e, an "ESCAPE" 30f. While it is understood that a thermostat can include function keys, a keypad, or key assembly, "manual pushbuttons" referred to in this description relate to the former manual pushbuttons and/or slide switches located on the HVAC apparatus 12. Similar to the manual pushbuttons, the input subsystems of the thermostat can allow a user to indicate a speed setting and/or temperature setting.

An output subsystem can include one or more of a display module and a speaker. For example, the display module can be a liquid crystal display (LCD). In some examples, the display module can serve as an output subsystem as well as an input subsystem when it is a touchscreen display having a touch-sensitive overlay. The touchscreen display can act as an input mechanism by providing a touch-sensitive input device. In other examples, the display module is only an output subsystem when it is a non-touch display. FIG. 2A shows an example of a thermostat display 22. As shown in FIG. 2A, the display module can display information for the time, date, temperature of the interior space, humidity of the interior space, outdoor temperature, speed of the air delivery module 24, and mode of operation of the HVAC apparatus 26.

Furthermore, the thermostat can also allow a user to provide a schedule that indicates temperature settings at various times throughout a day and/or week. The thermostat can have memory to store the schedule. In some examples, the schedule can be a multi-day schedule. For example, the schedule can be a seven (7) day schedule. In some examples, each day of a schedule can include a pre-determined maximum number of temperature changes. For example, each day of a schedule can include a maximum of about eight (8) temperature changes per day. In another example, each day of a schedule can include a maximum of about four (4) temperature changes per day. The thermostat can access the schedule and determine a corresponding temperature setting at any given time. The thermostat can also store a default schedule to be used in the absence of a schedule manually provided by the user. The default schedule can be typical settings based on a user-defined location of the thermostat.

In some examples, the thermostat can also allow a user to select a desired mode of operation for the HVAC apparatus 12. Exemplary desired modes of operation for the HVAC apparatus 12 can include an automatic mode, a heating mode, a cooling mode, a vacation (i.e. ambient or away) mode, and an off mode.

In some examples, the thermostat can also allow a user to define a program. A program can include a desired mode of operation, a time setting, and a temperature setting. When the thermostat can store a schedule, each day of a schedule can include a pre-determined maximum number of program changes. For example, each day of a schedule can include a maximum of about four (4) program changes per day, and they can be programmed for one day at a time or multiple days at a time (e.g., Monday thru Friday, or Saturday and Sunday).

In some examples, one or more control interface devices 16 can provide instructions to control the HVAC apparatus 12. For example, both a thermostat and manual pushbuttons can be provided.

The control interface device 16 can be equipped with built-in electrical energy storage, such as, for example, batteries, in the event that electrical power supply to the control interface device 16 is lost or disconnected. Furthermore, the control interface device 16 can be configured to retain settings immediately prior to a loss of power so that it does not need to be re-programmed after the loss of power.

The control interface device 16 can also include sensors for monitoring the interior space. For example, the thermostat can include a temperature sensor for detecting the temperature of the interior space. In some examples, the thermostat can include a humidity sensor for detecting the humidity level of the interior space, herein referred to as the monitored humidity. The control interface device 16 can further control the operation of the HVAC apparatus 12 based on the monitoring. For example, the control interface device 16 can provide instructions to operate the air delivery module at a speed that is proportional to the difference between the monitored, or actual temperature of the interior space and the temperature setting.

Figure 3:
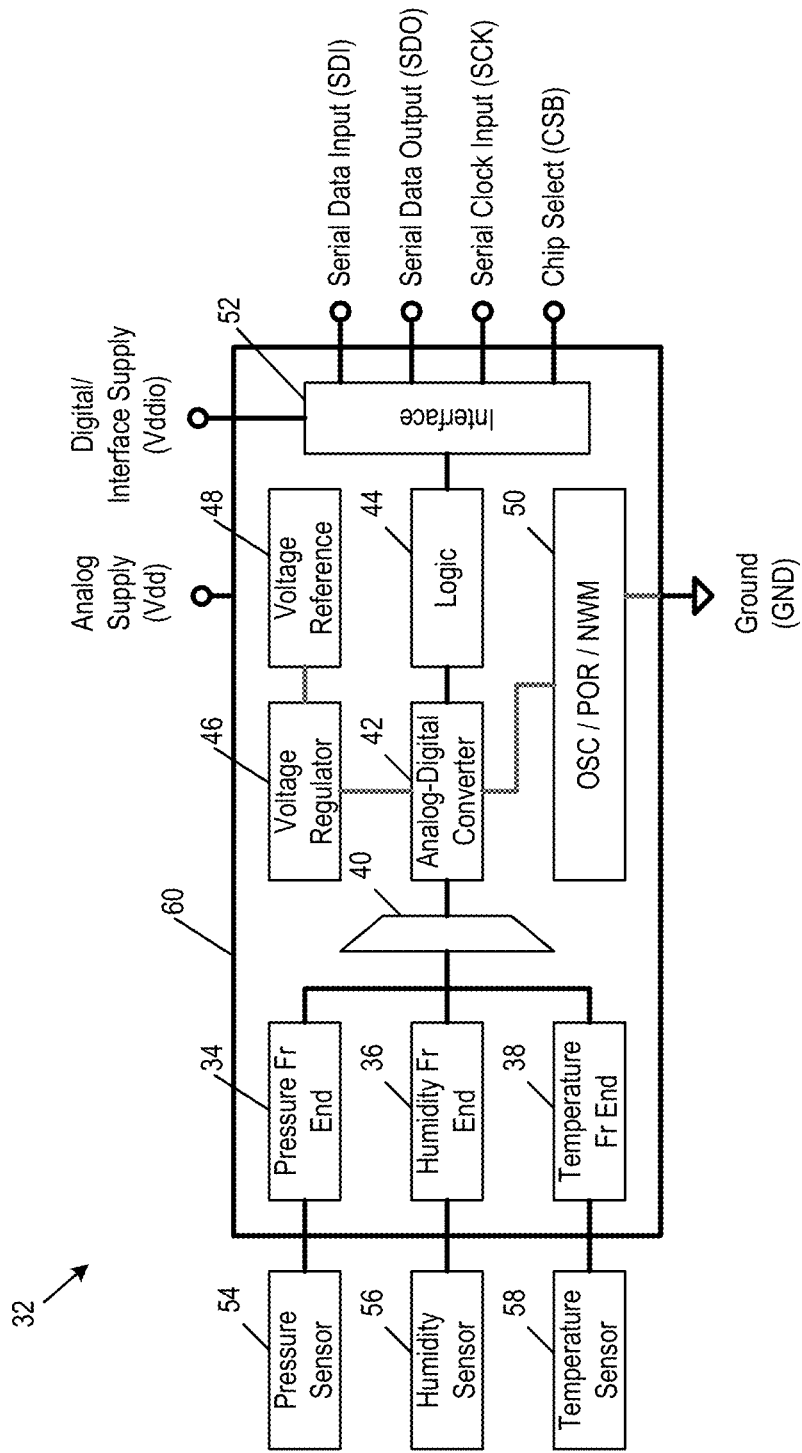
FIG. 3 is a schematic drawing of a sensor module of a control interface device.

FIG. 3 shows an example sensor module 32 that can be included in the control interface device 16 for providing sensors for monitoring the interior space. As shown in FIG. 3, the sensor module 32 can include a pressure sensor 54, a humidity sensor 56, and a temperature sensor 58. As shown in FIG. 3, the sensor module 32 can include front end devices 34, 36, 38, which can provide buffering and/or level adjustment for input from each of the sensors 54, 56, 58. FIG. 3 further shows a combiner 40, an analog-digital converter 42, a logic control device 44, a voltage regulator 46, a voltage reference 48, oscillator 50 and an interface 52, and a module housing 60. In the oscillator 50, "POR" refers to "power on reset" and "NWM" refers to "normal wakeup mode".

In some examples, the control interface devices 16 can also receive and display information from the processor 14. Information from the processor 14 can include information about the status of the HVAC apparatus 12. As set out above, various sensors can be provided on the HVAC apparatus 12 and data from the various HVAC apparatus sensors can be provided to the control interface device 16 via the processor 14 for display to the user.

Furthermore, the processor 14 can be coupled to a transceiver for data communication over a wireless network. Via the wireless network, the processor 14 can obtain additional information such as outdoor temperature, outdoor humidity, and weather conditions, for example, rain or sunshine. The processor 14 can provide such additional information to the control interface device 16 for display to the user.

The client device 20 is a computing device and can be desktop computer, a portable laptop computer, or a mobile device such as a smartphone or a tablet computer. An HVAC apparatus control application can be downloaded to the client device 20 for execution. In some examples, the HVAC apparatus control application can be installed on the client device 20 for execution. In some examples, the HVAC apparatus control application can be provided at the client device 20 with a data storage device, such as a flash memory device, or a digital disc.

The client device 20 includes input and output subsystems. Input subsystems can include one or more of a display module, navigational input device, function keys, keyboard or keypad, and microphone. A navigational input device can be a mouse, trackpad or trackball. Function keys can be included on a key assembly.

Output subsystems can include one or more of a display module and speaker. In some examples, the display module can serve as an output subsystem as well as an input subsystem when it is a touchscreen display having a touch-sensitive overlay. The touchscreen display can act as an input mechanism by providing a touch-sensitive input device. In other examples, the display module is only an output subsystem when it is a non-touch display. When the display module is only an output subsystem, the client device 20 generally includes another input subsystem.

The client device 20 includes a communication subsystem for data communication over a wireless network. Via the wireless network, the client device 20 can download the HVAC apparatus control application.

When the HVAC apparatus control application is executed on the client device 20, the client device 20 can receive instructions from a user for controlling the operation of the HVAC apparatus 12. Similar to the control interface device 16, the client device 20 can allow the user to provide a speed setting, a temperature setting, a mode of operation, and/or a schedule. In some examples, various security protocols (i.e. login and password) can be incorporated to ensure that control of the HVAC apparatus 12 is being provided to appropriate users.

When the HVAC apparatus control application is executed on the client device 20, the client device 20 can also receive and transmit information to and from the processor 14. In particular, the client device 20 provides instructions received from the user to the processor 14.

Similar to the control interface device 16, the client device 20 can also receive and display information from the processor 14. Information displayed on the client device 20 can be data obtained by the HVAC apparatus 12, the control interface device 16, or data obtained over the wireless network. Various reports and notifications can be provided on the client device 20 based on this data. For example, the client device 20 can receive and display monthly, quarterly, and annual usage reports. As well, the client device 20 can receive and provide notifications related to the HVAC apparatus 12. In this manner, the user can be alerted of the notifications irrespective of the location of the user. Notification can, for example, relate to whether the processor 14 has lost connection to the network, if settings are not updated on the control interface device 16 (such as speed of the air delivery module 24, and mode of operation of the HVAC apparatus 26 shown in FIG. 2A), if the difference between the monitored temperature and the temperature setting exceeds a pre-determined threshold, if the monitored humidity is outside of a pre-determined range, if the fill level of the drain pan is greater than the pre-determined drain pan fill limit, and if the temperature of incoming air is too cold and can cause the hydronic coil to freeze, and/or there is power loss at the HVAC apparatus.

Data obtained over the wireless network can include electricity related data such at pricing, demand, and/or supply. It can be desirable to control of the HVAC apparatus 12 based on electricity related data. For example, when electricity prices are high, electricity demand is high, and/or electricity supply is low, a user can decide to reduce their use of electricity by reducing the speed setting of the air delivery module or by not energizing the auxiliary heater.

The server 18 can be any computing device suitable to relay instructions for the HVAC apparatus between the client device 20 and the processor 14. The server 18 can be located remotely from each of the client device 20 and the processor 14. The server 18 can include a network interface for connecting to the network, for example, to communicate with processor 14 and client device 20. The server 18 receives instructions for the HVAC apparatus 12 from the client device 20 and transmits the instructions to the processor 14. In some examples, the server 18 can store access information for the client device 20 to ensure that the client device 20 satisfies security protocols (i.e. login and password) before allowing the client device 20 to control the HVAC apparatus 12.

In some examples, the server 18 can also receive instructions for the HVAC apparatus received by the control interface device 16 or monitoring data generated by sensors of the HVAC apparatus 12 and/or the control interface device 16 via the processor 14. The server 18 can include a data storage device to store data and/or instructions from the client device 20 and/or the control interface device 16. The server 18 can analyze the data and/or instructions and generate notifications to provide to the user via client device 20.

The instructions for the HVAC apparatus 12 can be received by the server 18 via the HVAC apparatus control application. In some examples, the HVAC apparatus control application can be a web server application that is accessible by a web browser application on a client device 20. The server 18 can also be capable of hosting a website that allows users to login and provide instructions. In some examples, the HVAC apparatus control application can be a web service that is accessible by a standalone application on the client device 20. In some examples, the server 18 can include a data storage device to store the HVAC apparatus control application to be downloaded by the client device 20.

Although described as a single server, in various examples, the server 18 can be distributed such that functionality of the server 18 resides on separate computing devices.

The processor 14 is a computer processor, such as a microcontroller. In some examples, the processor 14 can be a general purpose microprocessor, a field programmable gate array, application specific integrated circuit, or other suitable computer processor. The processor 14 is capable of executing instructions. When executing instructions, the processor 14 can receive inputs from a variety of input devices and transmit outputs to a variety of output devices to which it is coupled. It will be appreciated that various other arrangements can be used. For example, the processor 14 can be one or more processors.

The processor 14 can receive instructions from the control interface device 16 and provide appropriate control signals to the HVAC apparatus 12. Communication between the control interface device 16 and the processor 14 can be provided by a wired connection or a wireless connection. Preferably, communication between the control interface device 16 and the processor 14 is provided by a wired connection, which can be more reliable than a wireless connection. For example, direct pin connections can be provided between manual pushbuttons and the processor 14.

Figure 4:
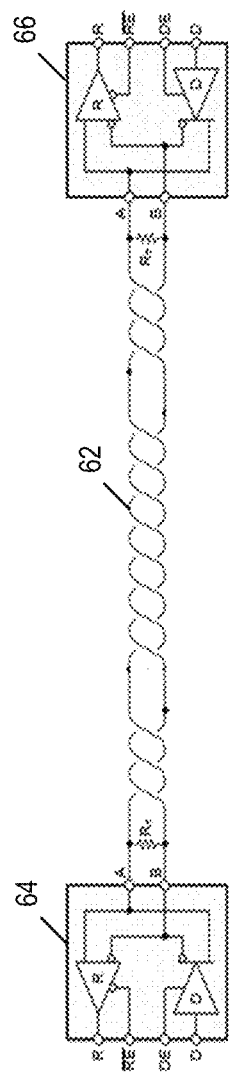
FIG. 4 is a schematic drawing of a connection between a processor and a control interface device.

A data communication link can be provided between a thermostat and the processor 14. The data communication link can be a serial data communication link or a parallel data communication link. In some examples, the serial data communication link includes a twisted pair cable connection. FIG. 4 shows an example of a twisted pair cable 62 connecting a transceiver 64 of a processor 14 to a transceiver 66 of a control interface device 16. Preferably, the serial data communication link is reliable and capable of two-way data transfer over about a few hundred feet. In some examples, the serial data communication link complies with industry standards, such as, for example, TIA-485-A (also known as ANSI/TIA/EIA-485, TIA/EIA-485, EIA-485 or RS-485). The serial data communication link can also include conventional seven-wire or nine-wire hydronic control coupling.

The instructions that the processor 14 receives from the control interface device 16 are herein referred to as "local instructions" because the control interface device 16 is located on the HVAC apparatus 12 or within the interior space that the HVAC apparatus 12 serves. In contrast, instructions provided over a network, irrespective of location, are herein referred to as "remote instructions". It is understood that remote instructions can be provided over the network by a client device 20 that is located within or outside of the interior space.

The processor 14 can be coupled to a transceiver to receive remote instructions over a wireless network. In some examples, the transceiver can be a Wi-Fi transceiver. The transceiver can be adapted to overcome transmission impediments such as metal studs used in the building structure that can affect the transmission distance. In some examples, the processor 14 and the transceiver can be located within a metal enclosure of the vertical fan coil unit while an antenna of the transceiver can be positioned outside of the metal enclosure.

When the processor 14 receives a plurality of instructions (e.g., local instructions from more than one control interface device 16, or local instructions from one or more control interface device 16 and remote instructions from a client device 20), the processor 14 can elect one of the plurality of instructions to adopt for controlling the HVAC apparatus 12. In some examples, the processor 14 can adopt instructions on a temporal basis, irrespective of the source. For example, the processor 14 can adopt instructions that were last received. In some examples, the processor 14 can adopt instructions based on the source. For example, the processor 14 can give priority to instructions received from manual pushbuttons. In the absence of instructions from the manual pushbuttons, the processor 14 can give priority to instructions received from a thermostat. In the absence of instructions from the thermostat, the processor 14 can give priority to remote instructions. The processor 14 can store default instructions to use in the absence of any instructions. Exemplary default instructions can include a temperature setting of 20 degrees Celsius, a low speed setting for the air delivery module, and an automatic mode for the HVAC apparatus 12.

In some examples, when the instructions include a numerical value such as a temperature setting, the processor 14 can use an average of the plurality of instructions as the temperature setting for controlling the HVAC apparatus 12. In some examples, the processor 14 can be capable of various methods for selecting one of the plurality of instructions to be used for controlling the HVAC apparatus 12 and the user can configure the processor 14 to use one of the methods available.

As set out above, the control interface device 16 can include sensors for monitoring the interior space. The control interface device 16 can provide monitoring data to the processor 14. For example, the control interface device 16 can monitor a temperature of the interior space and provide the temperature, herein referred to as the monitored temperature, to the processor 14. The processor 14 can control the operation of the HVAC apparatus 12 based on the monitored temperature.

In some examples, the processor 14 can compare the monitored temperature with the temperature setting and control the operation of HVAC apparatus 12 accordingly. For example, the processor 14 can provide instructions to operate the air delivery module at a speed that is proportional to the difference between the monitored temperature and the temperature setting. The processor 14 can compare the magnitude of the difference between the monitored temperature and the temperature setting to pre-determined thresholds that are indicative of which speed setting should be used. For example, if the difference between the monitored temperature and the temperature setting is greater than about 7 degrees Celsius, a high speed setting can be selected. If the difference is less than about 7 degrees Celsius and greater than about 3 degrees Celsius, a medium speed setting can be selected. If the difference is less than about 3 degrees Celsius and greater than about 1.5 degrees Celsius, a low speed setting can be selected. If the difference is less than about 1.5 degrees Celsius, an ultra-low speed setting can be selected.

The processor 14 can determine that the monitored temperature is substantially higher than the temperature setting and provide instructions to operate in a cooling mode. Conversely, the processor 14 can determine that the monitored temperature is substantially lower than the temperature setting and provide instructions to operate in a heating mode. If the processor 14 determines that the temperature setting has been achieved (i.e. the monitored temperature is substantially the same as the temperature setting), the HVAC apparatus 12 can be instructed to operate in an ambient mode.

In some examples, the temperature setting can include a margin, or deadband. The processor 14 can determine that the monitored temperature is substantially the same as the temperature setting, that is the temperature setting has been achieved, when the monitored temperature is within the deadband. The value of the deadband can be any appropriate value. For example, a deadband can be ±1.5 degrees Celsius. If the monitored temperature is within 1.5 degrees of the temperature setting, the processor 14 can determine that the monitored temperature is substantially the same as the temperature setting. However, if the monitored temperature is 2 degrees Celsius higher than the monitored temperature, the processor 14 can provide instructions to operating in a cooling mode. Conversely, if the monitored temperature is 3 degrees Celsius lower than the monitored temperature, the processor 14 can provide instructions to operate in a heating mode.

To operate an HVAC apparatus 12 having a four-pipe hydronic heating and cooling source in a cooling mode, the processor 14 can generate and provide commands to open the cold water supply valve and close the hot water supply valve. For the heating mode, the cold water supply valve can be closed and the hot water supply valve can be opened. For the ambient mode, both the cold water and the hot water supply valves can be closed.

The commands for operation of the HVAC apparatus 12 having a two-pipe system hydronic heating and cooling source can depend on whether hot or cold water is being supplied. If hot water is being supplied, the supply valve can be opened for the heating mode and closed for the cooling mode or the ambient mode. If cold water is being supplied, the supply valve can be opened for the cooling mode and closed or the ambient mode. Furthermore, when cold water is supplied and an auxiliary heater is provided, the auxiliary heater can be energized and the supply valve can be opened for the heating mode. However, when cold water is supplied and an auxiliary heater is not provided, the supply valve can be closed for the heating mode.

In some examples, the processor 14 can determine whether cold or hot water is being supplied based on sensors monitoring the temperature of the supply line. The sensors can be located on, or substantially near, the supply valves. The processor 14 can compare the temperature of the supply line to pre-determined thresholds that are indicative of cold water or hot water. For example, a pre-determined threshold indicative of cold water can be about 18 degrees Celsius (i.e. 65 degrees Fahrenheit). A pre-determined threshold indicative of hot water can be about 29 degrees Celsius (i.e. 85 degrees Fahrenheit).

If the temperature of the supply line is not monitored, other inputs can be provided to the processor 14 to determine whether cold or hot water is being supplied. For example, a manual pushbutton or switch can be provided on the HVAC apparatus 12 to indicate whether cold or hot water is being supplied.

Figure 5:
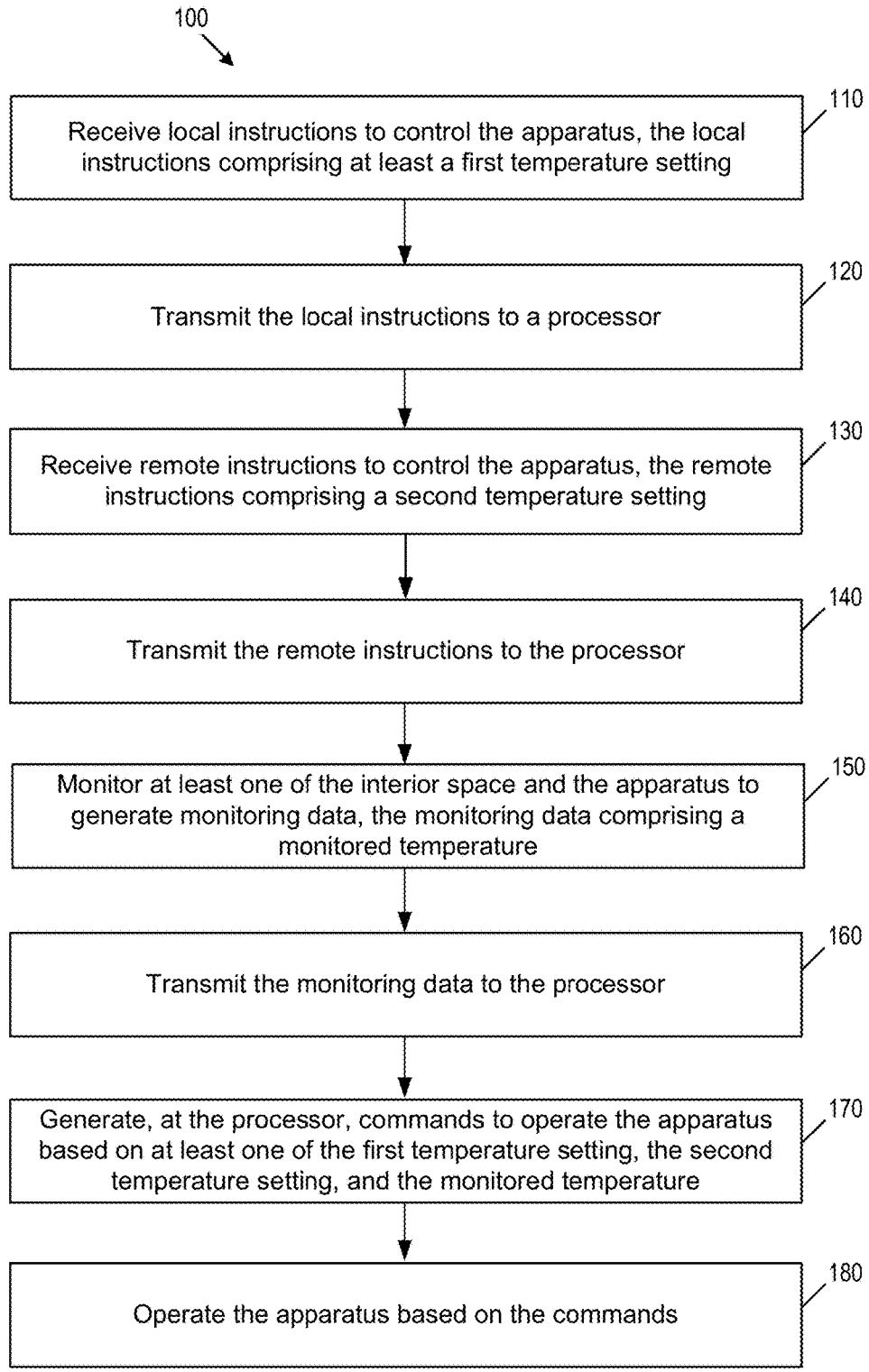
FIG. 5 is a flowchart of a method of monitoring and controlling an HVAC apparatus.

Referring to FIG. 5, therein illustrated is a flowchart of a method 100 of monitoring and controlling HVAC technology. It will be appreciated that, in some examples, steps of the method 100 may not be completed in the particular order that they are shown and described.

The method 100 begins at step 110. At step 110, local instructions to control an HVAC apparatus 12 are received. The local instructions include at least a first temperature setting. At step 120, the local instructions are transmitted to a processor 14.

At step 130, remote instructions to control an HVAC apparatus 12 are received. The remote instructions include at least a second temperature setting. At step 140, the remote instructions are transmitted to the processor 14.

At step 150, at least one of the interior space and the HVAC apparatus 12 are monitored to generate monitoring data. The monitoring data can include a monitored temperature for the interior space. At step 160, the monitoring data is transmitted to the processor 14.

At step 170, the processor 14 generates commands to operate the HVAC apparatus 12 based on at least one of the first temperature setting it received at step 120, the second temperature setting it received at step 140, and the monitoring data it received at step 160. At step 180, the HVAC apparatus 12 is operated based on the commands generated by the processor 14.

Figure 6:
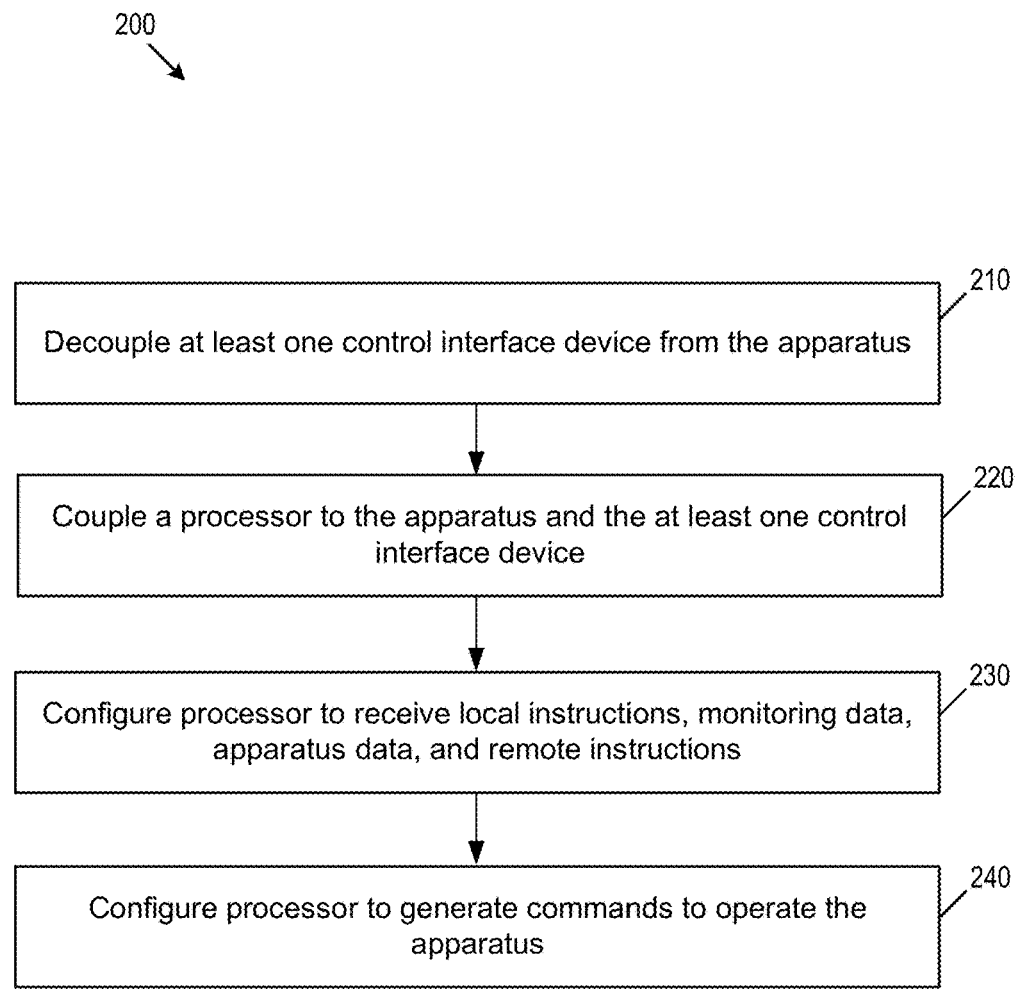
FIG. 6 is a flowchart of a method of installing a system for monitoring and controlling an HVAC apparatus.

FIG. 6 is a flowchart of a method 200 of installing a system for monitoring and controlling HVAC technology. It will be appreciated that, in some examples, steps of the method 200 may not be completed in the particular order that they are shown and described.

The method 200 begins at step 210. At step 210, at least one control interface device 16 is decoupled from the HVAC apparatus 12. At step 220, a processor 14 is coupled to the HVAC apparatus 12 and the control interface device 16. At steps 230 and 240, the processor 14 is configured to receive local instructions and monitoring data from the control interface device 16, apparatus data, and remote instructions, and generate commands to operate the HVAC apparatus 12.

While the above description provides examples of one or more apparatuses or methods, it will be appreciated that other apparatuses or methods may be within the scope of the accompanying claims.

I claim:
1. A system, comprising:
 a. an apparatus for heating, ventilation and/or cooling of an interior space of a structure, the apparatus comprising at least one sensor for monitoring the apparatus and generating apparatus data;
 b. at least one control interface device for receiving local instructions to control the apparatus and monitor the interior space to generate monitoring data, the local instructions comprising at least a first temperature setting, the monitoring data comprising a monitored temperature of the interior space; and
 c. a processor coupled to the apparatus and the at least one control interface device, the processor being configured for
  i. receiving the local instructions and the monitoring data from the at least one control interface device, the apparatus data from the apparatus, and remote instructions to control the apparatus from a client device, the remote instructions comprising a second temperature setting, and
  ii. generating commands to operate the apparatus based on at least one of the first temperature setting, the second temperature setting, the monitored temperature, and the apparatus data,
 wherein the generating commands comprises:
  a. determining a set temperature based on the first temperature setting and the second temperature setting;
  b. comparing the set temperature to the monitored temperature;
  c. if the monitored temperature is substantially less than the set temperature, generating commands to operate the apparatus in a heating mode;
  d. if the monitored temperature is substantially greater than the set temperature, generating commands to operate the apparatus in a cooling mode; and
  e. otherwise generating commands to operate the apparatus in an ambient mode,
 wherein:
  a. the apparatus comprises at least one water valve, each of the at least one water valve being supplied with either cold water or hot water;
  b. for a water valve supplied with cold water,
   i. the commands to operate the apparatus in an ambient mode comprise a command to close the water valve, and
   ii. the commands to operate the apparatus in a cooling mode comprise a command to open the water valve; and
  c. for a water valve supplied with hot water,
   i. the commands to operate the apparatus in a heating mode comprise a command to open the water valve, and
   ii. the commands to operate the apparatus in a cooling mode or an ambient mode comprise a command to close the water valve; and
 wherein:
  a. the at least one sensor comprises a water temperature sensor located on or substantially near the water valve for generating supply water temperature apparatus data; and b. the generating commands comprises:
  i. comparing the supply water temperature to a pre-determined cold water temperature and a pre-determined hot water temperature;
  ii. if the supply water temperature is less than the pre-determined cold water temperature, determining that cold water is supplied to the water valve;
  iii. if the supply water temperature is greater than the pre-determined hot water temperature, determining that hot water is supplied to the water valve.

2. The system of claim 1, wherein the processor is in wired communication with the at least one control interface device.

3. The system of claim 2, wherein the wired communication comprises a direct pin connection.

4. The system of claim 2, wherein the wired communication comprises a data communication link.

5. The system of claim 4, wherein the data communication link comprises at least one of an RS-485 communication link, a seven wire hydronic control coupling, and a nine wire hydronic control coupling.

6. The system of claim 1, wherein the at least one control interface device comprises at least one of a manual control button and a thermostat.

7. The system of claim 1, comprising a 24 VAC connection coupling the processor to the apparatus.

8. The system of claim 1, wherein:
a. the local instructions comprise a local temperature schedule, the local temperature schedule being indicative of a temperature setting for each of a plurality of times; and
b. the generating commands comprises, for a relevant time, identifying a relevant temperature setting from the local temperature schedule as the first temperature setting.

9. The system of claim 1, wherein:
a. the remote instructions comprise a remote temperature schedule, the remote temperature schedule being indicative of a temperature setting for each of a plurality of times; and
b. the generating commands comprises, for a relevant time, identifying a relevant temperature setting from the remote temperature schedule as the second temperature setting.

10. The system of claim 1, wherein the determining a set temperature comprises identifying one of the at least a first temperature setting and the second temperature setting that was received last as the set temperature.

11. The system of claim 1, wherein:
a. the apparatus comprises a vertical fan coil;
b. the apparatus data comprises a vertical fan coil temperature; and
c. the generating commands comprises
  i. comparing the vertical fan coil temperature to a pre-determined vertical fan coil freezing temperature,
  ii. for a water valve supplied with cold water, if the vertical fan coil temperature is less than the pre-determined vertical fan coil freezing temperature, generating commands to perform at least one of close the water valve and energize an auxiliary heater, and
  iii. otherwise maintaining commands to operate the apparatus.

12. The system of claim 11, wherein:
a. the at least one sensor comprises a temperature sensor for generating resistance apparatus data; and
b. the processor being configured for
  i. storing a resistance-to-temperature mapping, the resistance-to-temperature mapping comprising a temperature for each of a plurality of resistances, and
  ii. for the resistance apparatus data, identifying corresponding vertical fan coil temperature apparatus data based on the resistance-to-temperature mapping.

13. The system of claim 12, wherein the apparatus comprises a fresh air supply stream and the at least one sensor is located on the fresh air supply stream.

14. The system of claim 1, wherein:
a. the apparatus comprises an auxiliary heater;
b. the commands to operate the apparatus in a heating mode comprise a command to energize the auxiliary heater; and
c. the commands to operate the apparatus in a cooling mode or an ambient mode comprise a command to de-energize the auxiliary heater.

15. The system of claim 1, wherein the apparatus comprises an air delivery module, the air delivery module being operable at a plurality of speed settings.

16. The system of claim 15, wherein:
a. at least one of the local instructions and remote instructions comprise a set speed, the set speed being one of the plurality of speed settings; and
b. the commands to operate the apparatus comprise commands to operate the air delivery module at the set speed.

17. The system of claim 15, wherein:
a. the generating commands to operate the apparatus in a heating mode or a cooling mode comprises selecting a set speed from the plurality of speed settings based on a magnitude of difference between the set temperature and the monitored temperature; and
b. the generating commands to operate the apparatus in an ambient mode comprises generating commands to operate the air delivery module at a low speed setting.

18. The system of claim 1, wherein:
a. the apparatus comprises a drain pan;
b. the apparatus data comprises a fill level of the drain pan; and
c. the generating commands comprises
  i. comparing the fill level to a pre-determined drain pan fill limit,
  ii. if the fill level is greater than the pre-determined drain pan fill limit, generating commands to discontinue operating the apparatus, and
  iii. otherwise maintaining commands to operate the apparatus.

19. The system of claim 18, wherein the at least one sensor comprises a Hall effect sensor for generating the fill level apparatus data.

20. The system of claim 1, wherein the monitoring data comprises a humidity level of the interior space.

21. The system of claim 1, wherein the system comprises the client device for generating the remote instructions and transmitting the remote instructions to the processor.

22. The system of claim 21, wherein the client device is in wireless data communication with the processor.

23. The system of claim 21, wherein the client device is configured for:
a. receiving a notification from the processor based on at least one of the apparatus data and the monitoring data; and
b. providing the notification to a user of the client device.

24. The system of claim 1, wherein the system comprises a server for receiving the remote instructions from the client device and transmitting the remote instructions to the processor.

25. The system of claim 24, wherein the server is in wireless data communication with at least one of the client device and the processor.

26. A method of controlling an apparatus for heating, ventilation and/or cooling of an interior space of a structure, the apparatus comprising at least one water valve, the method comprising:
   a. receiving local instructions to control the apparatus, the local instructions comprising at least a first temperature setting;
   b. transmitting the local instructions to a processor;
   c. receiving remote instructions to control the apparatus, the remote instructions comprising a second temperature setting;
   d. transmitting the remote instructions to the processor;
   e. monitoring at least one of the interior space and the apparatus to generate monitoring data, the monitoring data comprising a monitored temperature of the interior space and a supply water temperature of the at least one water valve;
   f. transmitting the monitoring data to the processor;
   g. at the processor, generating commands to operate the apparatus based on at least one of the first temperature setting, the second temperature setting, the monitored temperature and the supply water temperature, comprising:
      determining a set temperature based on the first temperature setting and the second temperature setting;
      comparing the set temperature to the monitored temperature, if the monitored temperature is less than the set temperature, generating commands to operate the apparatus in a heating mode, if the monitored temperature is greater than the set temperature, generating commands to operate the apparatus in a cooling mode, otherwise generating commands to operate the apparatus in an ambient mode; and
      comparing the supply water temperature to a pre-determined cold water temperature and a pre-determined hot water temperature, if the supply water temperature is less than the pre-determined cold water temperature, determining that cold water is supplied to the water valve, and if the supply water temperature is greater than the pre-determined hot water temperature, determining that hot water is supplied to the water valve,
      wherein, if the at least one water valve is supplied with cold water, the commands to operate the apparatus in the ambient mode comprise a command to close the water valve, and the commands to operate the apparatus in the cooling mode comprise a command to open the water valve, and
      wherein, if the at least one water valve is supplied with hot water, the commands to operate the apparatus in the heating mode comprise a command to open the water valve, and the commands to operate the apparatus in the cooling mode or the ambient mode comprise a command to close the water valve; and
   h. operating the apparatus based on the commands.

27. A system, comprising:
   an apparatus for heating, ventilation and/or cooling of an interior space of a structure;
   at least one water valve that is supplied with either cold water or hot water;
   at least one sensor for monitoring at least one of the interior space and the apparatus to generate monitoring data, the monitoring data comprising a monitored temperature of the interior space;
   a water temperature sensor positioned to generate supply water temperature data at the at least one water valve;
   at least one control interface device for receiving local instructions to control the apparatus, the local instructions comprising a first temperature setting; and
   a processor configured to
      receive the monitoring data, the local instructions, and remote instructions to control the apparatus from a client device, the remote instructions comprising a second temperature setting, and
      generate commands based on the monitoring data, the local instructions and the remote instructions,
   wherein the processor is configured to determine a set temperature based on the first temperature setting and the second temperature setting, and compare the set temperature to the monitored temperature,
   wherein, if the monitored temperature is less than the set temperature, the processor is configured to generate commands to operate the apparatus in a heating mode, if the monitored temperature is greater than the set temperature, the processor is configured to generate commands to operate the apparatus in a cooling mode, and otherwise the processor is configured to generate commands to operate the apparatus in an ambient mode,
   wherein the processor is configured to compare the supply water temperature to a pre-determined cold water temperature and a pre-determined hot water temperature, if the supply water temperature is less than the pre-determined cold water temperature, determine that cold water is supplied to the water valve, and if the supply water temperature is greater than the pre-determined hot water temperature, determine that hot water is supplied to the water valve,
   wherein, if the at least one water valve is supplied with cold water, the commands to operate the apparatus in the ambient mode comprise a command to close the water valve, and the commands to operate the apparatus in the cooling mode comprise a command to open the water valve, and
   wherein, if the at least one water valve is supplied with hot water, the commands to operate the apparatus in the heating mode comprise a command to open the water valve, and the commands to operate the apparatus in the cooling mode or the ambient mode comprise a command to close the water valve.

\* \* \* \* \*